US008655727B2

(12) United States Patent
Scholl et al.

(10) Patent No.: US 8,655,727 B2
(45) Date of Patent: Feb. 18, 2014

(54) METHOD AND SYSTEM FOR GENERATING AND PLACING KEYWORD-TARGETED ADVERTISEMENTS (75) Inventors: Nathaniel Blake Scholl, Issaquah, WA (US); Joanna Power, Seattle, WA (US); Alexander DeNeui, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1965 days.

(21) Appl. No.: 10/748,759

(22) Filed: Dec. 30, 2003

(65) Prior Publication Data
US 2005/0149390 A1 Jul. 7, 2005

(51) Int. Cl.
*G06Q 30/00* (2012.01)
(52) U.S. Cl.
USPC ............. 705/14.54; 705/14.4; 705/14.71; 705/14.72; 705/14.73
(58) Field of Classification Search
None
See application file for complete search history.

(56) References Cited

U.S. PATENT DOCUMENTS

| | | | |
|---|---|---|---|
| 5,615,109 A | 3/1997 | Eder | |
| 5,937,392 A | 8/1999 | Alberts | |
| 6,078,866 A * | 6/2000 | Buck et al. | 702/2 |
| 6,128,651 A | 10/2000 | Cezar | |
| 6,269,361 B1 | 7/2001 | Davis et al. | |
| 6,449,657 B2 * | 9/2002 | Stanbach et al. | 709/245 |
| 6,591,248 B1 | 7/2003 | Nakamura et al. | |
| 6,606,644 B1 * | 8/2003 | Ford et al. | 709/203 |
| 6,763,362 B2 | 7/2004 | McKeeth | |
| 6,826,572 B2 | 11/2004 | Colace et al. | |
| 6,915,294 B1 | 7/2005 | Singh et al. | |
| 6,963,863 B1 | 11/2005 | Bannon | |
| 6,978,263 B2 * | 12/2005 | Soulanille | 707/3 |
| 7,031,932 B1 | 4/2006 | Lipsky et al. | |
| 7,035,812 B2 | 4/2006 | Meisel et al. | |
| 7,043,450 B2 * | 5/2006 | Velez et al. | 705/37 |
| 7,076,443 B1 | 7/2006 | Emens et al. | |
| 7,080,073 B1 | 7/2006 | Jiang et al. | |
| 7,225,182 B2 | 5/2007 | Paine et al. | |
| 7,346,839 B2 | 3/2008 | Acharya et al. | |
| 7,363,254 B2 | 4/2008 | Skinner | |
| 2001/0053999 A1 * | 12/2001 | Feinberg | 705/14 |
| 2002/0024532 A1 | 2/2002 | Fables et al. | |
| 2002/0094868 A1 | 7/2002 | Tuck et al. | |

(Continued)

FOREIGN PATENT DOCUMENTS

WO WO 97/22066 A1 6/1997

OTHER PUBLICATIONS

International Search Report for International Patent Application No. PCT/US04/44021, Amazon Technologies, Inc., Nov. 22, 2006.

(Continued)

*Primary Examiner* — Yehdega Retta
(74) *Attorney, Agent, or Firm* — Novak Druce Connolly Bove + Quigg LLP (57) ABSTRACT

A method and system for identifying advertisement and search term combinations for placing advertisements along with search results. The advertisement system includes multiple advertisement generators that automatically create advertisement sets that each contain one or more advertisements, one or more search terms, and a link to an advertised item. The advertisement system also includes an advertisement manager that receives the advertisement sets from the advertisement generators, identifies a fee to be associated with each advertisement set, and selects which advertisement sets are to be submitted to various search engine services. The advertisement system may also include a fee calculator that generates a fee amount or bid for each advertisement set.

20 Claims, 11 Drawing Sheets

(56) References Cited

U.S. PATENT DOCUMENTS

| | | | |
|---|---|---|---|
| 2002/0103698 A1* | 8/2002 | Cantrell | 705/14 |
| 2003/0078913 A1 | 4/2003 | McGreevy | |
| 2003/0105677 A1* | 6/2003 | Skinner | 705/26 |
| 2003/0120626 A1 | 6/2003 | Piotrowski | |
| 2003/0120641 A1 | 6/2003 | Pelletier | |
| 2003/0216930 A1* | 11/2003 | Dunham et al. | 705/1 |
| 2004/0030556 A1 | 2/2004 | Bennett | |
| 2004/0044571 A1* | 3/2004 | Bronnimann et al. | 705/14 |
| 2004/0088241 A1 | 5/2004 | Rebane et al. | |
| 2004/0133469 A1* | 7/2004 | Chang | 705/14 |
| 2004/0162757 A1* | 8/2004 | Pisaris-Henderson et al. | 705/14 |
| 2004/0243581 A1 | 12/2004 | Weissman et al. | |
| 2004/0267806 A1 | 12/2004 | Lester | |
| 2005/0065806 A1* | 3/2005 | Harik | 705/1 |
| 2005/0071325 A1 | 3/2005 | Bem | |
| 2005/0097024 A1 | 5/2005 | Rainey | |
| 2005/0114198 A1 | 5/2005 | Koningstein et al. | |
| 2005/0120311 A1 | 6/2005 | Thrall | |
| 2005/0137939 A1* | 6/2005 | Calabria et al. | 705/26 |
| 2005/0144068 A1* | 6/2005 | Calabria et al. | 705/14 |
| 2005/0144069 A1* | 6/2005 | Wiseman et al. | 705/14 |
| 2005/0149388 A1 | 7/2005 | Scholl | |
| 2005/0160002 A1* | 7/2005 | Roetter et al. | 705/14 |
| 2005/0216335 A1 | 9/2005 | Fikes et al. | |
| 2005/0216516 A1 | 9/2005 | Calistri-Yeh et al. | |
| 2005/0228797 A1 | 10/2005 | Koningstein et al. | |
| 2005/0267872 A1 | 12/2005 | Galai et al. | |
| 2006/0041480 A1 | 2/2006 | Briggs | |
| 2006/0041536 A1 | 2/2006 | Scholl et al. | |

OTHER PUBLICATIONS

International Search Report mailed on Jun. 23, 2006, for International Application No. PCT/US2005/028148 filed on Aug. 8, 2005, 1 page.

Charlwood, W., "AdWords bid price; Facts about AdSense.com—Publishers and Advertisers; Vickrey auctions and AdWords; Vickrey Second Price Auctions," located at <http://www.facstaboutadsense.com/vickrey.htm>, last accessed on Feb. 24, 2009, 6 pages.

Lee, K., "Overture's Auto Bid Shifts the Gap," DMNews, Did-it.com, Aug. 22, 2002, located at <http://www.dmnews.com/Overtures-Auto-Bid-Shifts-the-Gap/article/78443>, last accessed on Feb. 25, 2009, 5 pages.

Seda, C., "Perfecting Paid Search Engine Listings-Search," Engine Watch (SEW) SearchEngineWatch.com, Oct. 17, 2002, located at <http://www.searchenginewatch.com/2161001>, last accessed on Feb. 25, 2009, 7 pages.

Sherman, C., "A Closer Look at Overture's Auto Bid System," Oct. 28, 2002, located at <http://www.searchenginewatch.com/2161071/print>, last accessed on Feb. 25, 2009, 3 pages.

Submit Express, "Google reindexes/partners with Ask Jeeves, Overture's Auto Bidding Tool, Teoma Toolbar, FTC," Submit Express Newsletter #56, Jul. 19, 2002, located at <http://www.submitexpress.com/newletters/july_19_02.html>, last accessed on Feb. 25, 2009, 9 pages.

\* cited by examiner

METHOD AND SYSTEM FOR GENERATING AND PLACING KEYWORD-TARGETED ADVERTISEMENTS

TECHNICAL FIELD

The described technology relates generally to generating and placing advertisements that are keyword targeted.

BACKGROUND

Many search engine services, such as Google and Overture, provide for searching for information that is accessible via the Internet. These search engine services allow users to search for web pages and other Internet-accessible resources that may be of interest to users. After a user submits a search request that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. Some search engine services can even search information sources that are not accessible via the Internet. For example, a book publisher may make the content of their books available to a search engine service. The search engine may generate a mapping between the keywords and books. When a search engine service receives a search request that includes one or more search terms, it uses its mapping to identify those information sources (e.g., web pages or books) whose keywords most closely match the search terms. The collection of information sources that most closely matches the search terms is referred to as the "search result." The search engine service then ranks the information sources of the search result based on the closeness of each match, web page popularity (e.g., Google's page ranking), and so on. The search engine service then displays to the user links to those information sources in an order that is based on their rankings. Oftentimes, so many information sources are identified as part of a search result that the search engine service groups the links into pages and displays one page at a time to the user. To view portions of a search result that are not on the first page, a user would need to select a next page button. Because users need to take this additional action to view links that are not displayed on the first page, only a small percentage of users actually select links that are not presented on the first page of a search result.

Some search engine services do not charge a fee to the providers of web pages for including links to their web pages in search results. Rather, the search engine services obtain revenue by placing advertisements along with search results. These paid-for advertisements are commonly referred to as "sponsored links," "sponsored matches," or "paid-for search results." A vendor who wants to place an advertisement along with certain search results provides a search engine service with an advertisement and search terms. When a search request is received, the search engine service identifies the advertisements whose search terms most closely match those of the search request. The search engine service then displays those advertisements along with the search results. If more advertisements are identified than will fit on the first page of the search results, the search engine service selects to display on the first page those advertisements belonging to the vendors that have offered to pay the highest price (e.g., placed the highest bid) for their advertisement. The search engine services can either charge for placement of each advertisement along with search results (i.e., cost per impression) or charge only when a user actually selects a link associated with an advertisement (i.e., cost per click).

Advertisers would like to maximize the effectiveness of advertising dollars used to pay for advertisements placed along with search results. Thus, advertisers try to identify search term and advertisement combinations that result in the highest benefits (e.g., most profit) to the advertiser. It would be desirable to have techniques that would allow advertisers to maximize the effectiveness of their advertising dollars by identifying effective advertisement and search term combinations. Moreover, it would be desirable to have an automated way to identify such effective combinations, determine an amount to pay for placement of the advertisements, and provide the combinations to search engine services for placement of the advertisements along with search results that match the search terms.

DETAILED DESCRIPTION

A method and system for identifying advertisement and search term combinations for placing advertisements along with search results is provided. In one embodiment, the advertisement system includes multiple advertisement generators that automatically create advertisement sets that each contain one or more advertisements, one or more search terms, and a link to each advertised item. The different advertisement generators may use different algorithms to automatically generate (or "create") advertisements (also referred to as the "creative"), identify search terms, and create links to form advertisement sets. For example, an advertisement generator may scan through a catalog of books that are being offered for sale by an advertiser and generate an advertisement set for a particular book that includes an advertisement based on the title of the book, search terms based on the words in the title, and a link to a detailed web page associated with the book. The advertisement system also includes an advertisement manager that receives advertisement sets from the advertisement generators, identifies a fee to be associated with each advertisement set, and selects which advertisement sets are to be submitted to various search engine services. Typically, each search engine service will only allow an advertiser to submit one advertisement set for each search term or each combination of search terms. (If a search engine service supports advertisement sets having more than one advertisement, it may randomly select one of the advertisements to display. If not, then the advertisement manager may select the advertisement that would provide the most benefit to the advertiser as the only advertisement of the advertisement set.) Thus, when different advertisement sets specify the same search terms, the advertisement manager selects which of the different advertisement sets to submit. For example, advertisement sets may be selected based on past success in achieving an advertiser's objective (e.g., maximizing profits or maximizing impressions). The advertisement system may also include a fee calculator that generates a fee amount or bid for each advertisement set. The fee calculator may analyze advertising metrics collected by the advertiser (e.g., average revenue per click) for advertisements generated by the same advertisement generator or metrics provided by the search engine services to identify an appropriate fee amount. In this way, advertisement sets may be automatically generated and automatically submitted to search engine services to help achieve an advertiser's objectives.

The advertisement system may be used to generate and place advertisements along with any type of content that has associated keywords. Such advertising is referred to as "keyword-targeted advertising." A search term associated with a search result is an example of such a keyword, and the search result is an example of the content. Another example of a keyword and content would be a web page with text (e.g., a news story) as its content and a keyword derived from the text (e.g., a headline) or the metadata associated with the text. Keywords may be derived using various Information Retrieval techniques based on word frequencies, clustering algorithms that identify related keywords, and so on. One skilled in the art will appreciate that the advertisement system can be used to generate and place advertisements with an advertisement placement service (e.g., a search engine service) for use in other contexts, such as while content is being streamed to a client, on a web page through which a product can be purchased, and so on.

In one embodiment, an advertisement generator determines where to place an advertisement for an item based on previous selections of links associated with that item that were included in search results. For example, if a link is presented on the third page of a search result and a user selects that link, then it may be assumed that the user thought that link was especially relevant to the search request because the user had to view several pages of the search result to find that link. In general, the advertisement generator identifies those links that were not prominently displayed in a search result but were nevertheless selected by users. The advertisement generator then generates an advertisement set that includes an advertisement for the item associated with the links, the search terms associated with the search request, and a link to a web page with information about the item. That advertisement is then submitted to a search engine service so the advertisement can be displayed prominently along with the search results of search requests that use those search terms. In this way, the advertisement generator identifies search term and item combinations that may be used to produce very effective advertisement sets.

Figure 1:
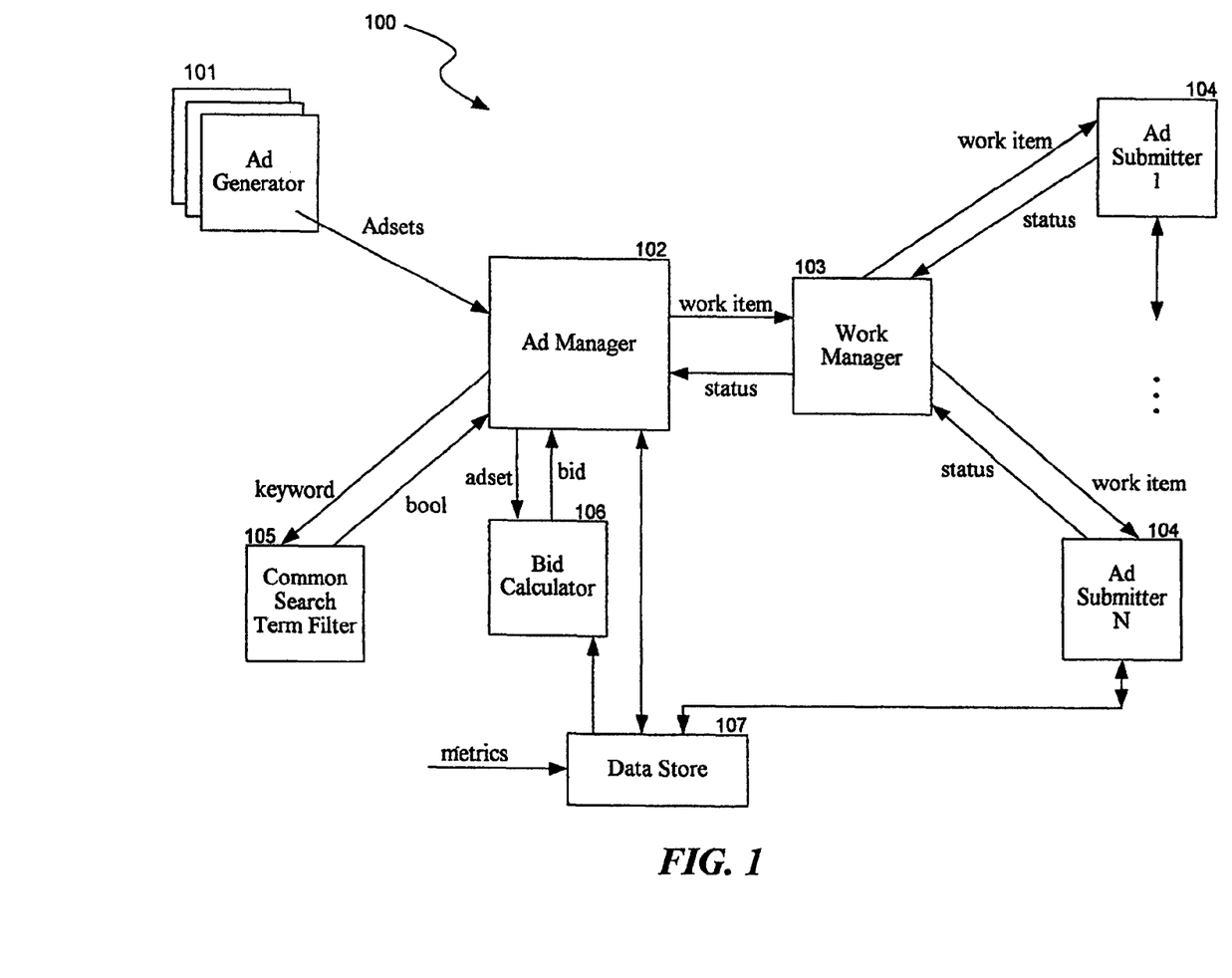
FIG. 1 is a block diagram illustrating components of the advertisement system in one embodiment.

FIG. 1 is a block diagram illustrating components of the advertisement system in one embodiment. The advertisement system 100 includes advertisement generators 101, an advertisement manager 102, a work manager 103, and advertisement submitters 104. Each advertisement generator generates advertisement sets based on a computer algorithm and then provides the advertisement sets to the advertisement manager. Each advertisement set includes an advertisement, one or more search terms, and a link (e.g., a uniform resource locator).

The advertisement manager, upon receiving an advertisement set, invokes a common search term filter 105 to determine whether the search terms of the advertisement set are too common for use as search terms in advertisement sets (e.g., noise words). The advertisement system may not want to place an advertisement associated with overly common search terms because the fee amount would likely need to be too high to compete with other advertisers. If one or more search terms are filtered, the advertisement manager may remove each filtered search term from the advertisement set or may not submit that advertisement set to a search engine service. The words included in a common search term filter may be automatically identified by, for example, analyzing word frequencies in a corpus of documents. In one embodiment, the advertisement manager also includes another filter for search terms that are for some reason undesirable (e.g., politically sensitive or a trademark) for use as search terms in advertisement sets. These undesirable search terms may be manually designated for each country or region. For those advertisement sets that pass the common search term filter and the undesirable search term filter, the advertisement manager invokes a bid calculator 106 to calculate a bid amount for each advertisement set. The bid calculator may access various metrics of a data store 107 to determine the appropriate bid amount for each advertisement set. The metrics may include detailed information relating to previous placements of advertisements with search terms and may be collected from the search engine services, from session data of users who selected advertisements, and so on. Such detailed information may include the cost of an advertisement, whether a user selected an advertisement, resulting profit from the selection of an advertisement, and so on. The bid calculator may also generate different bid amounts for each search engine service. The bid calculator may also use different algorithms for different categories of advertisements. For example, an advertiser may use an algorithm that will maximize the profit for established product lines, and a different algorithm that will maximize sales for new product lines. The advertisement manager may determine whether an advertisement set has already been submitted for the search terms of the advertisement set. If so, the advertisement manager may decide whether to withdraw the submission of the previous advertisement set and submit this new advertisement set or disregard this new advertisement set.

The advertisement manager submits work items to the work manager. A work item instructs the work manager to submit an advertisement set, withdraw a previously submitted advertisement set, or update the bid amount of a previously submitted advertisement set. The work manager may queue work items in the data store until an advertisement submitter requests them. The work manager may track which work items have already been provided to which advertisement submitter effectively maintaining a queue for each advertisement submitter. The work manager may also modify work items relating to the same advertisement set. For example, if a queue contains two work items to change a bid for the same advertisement set, then the work manager may change the bid amount on the first work item and delete the second work item to increase the efficiency of changing the bid to the new bid amount.

Each advertisement submitter may be associated with a specific search engine service and be tailored to submit advertisement sets in accordance with an interface defined by the search engine service. For example, one advertisement submitter may be associated with Google, and another may be associated with Overture. The advertisement submitters periodically retrieve work items from the work manager and convert those work items into service requests for the search engine services. The service requests include requests to submit an advertisement set, withdraw a previously submitted advertisement set, and change the bid of a previously submitted advertisement set.

The advertisement system may be implemented on computer systems and servers that include a central processing unit, a memory, input devices (e.g., keyboard and pointing devices), output devices (e.g., display devices), and storage devices (e.g., disk drives). The memory and storage devices are computer-readable media that may contain instructions that implement the advertisement system. In addition, the data structures and message structures may be stored or transmitted via a data transmission medium, such as a signal on a communications link. Various communications links may be used, such as the Internet, a local area network, a wide area network, or a point-to-point dial-up connection.

Figure 2:
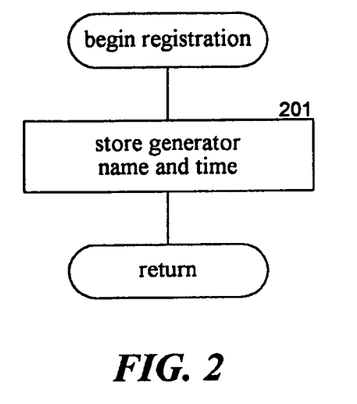
FIG. 2 is a flow diagram illustrating the processing of the begin registration component in one embodiment.
Figure 3:
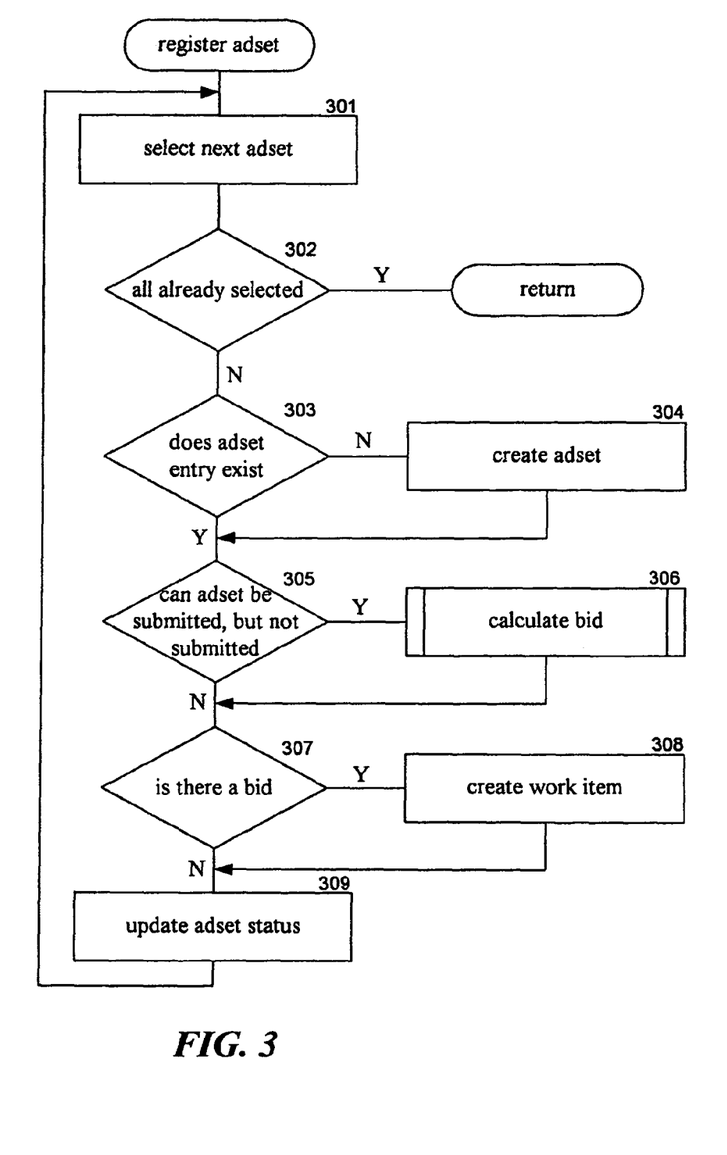
FIG. 3 is a flow diagram illustrating the processing of the register advertisement set component in one embodiment.
Figure 4:
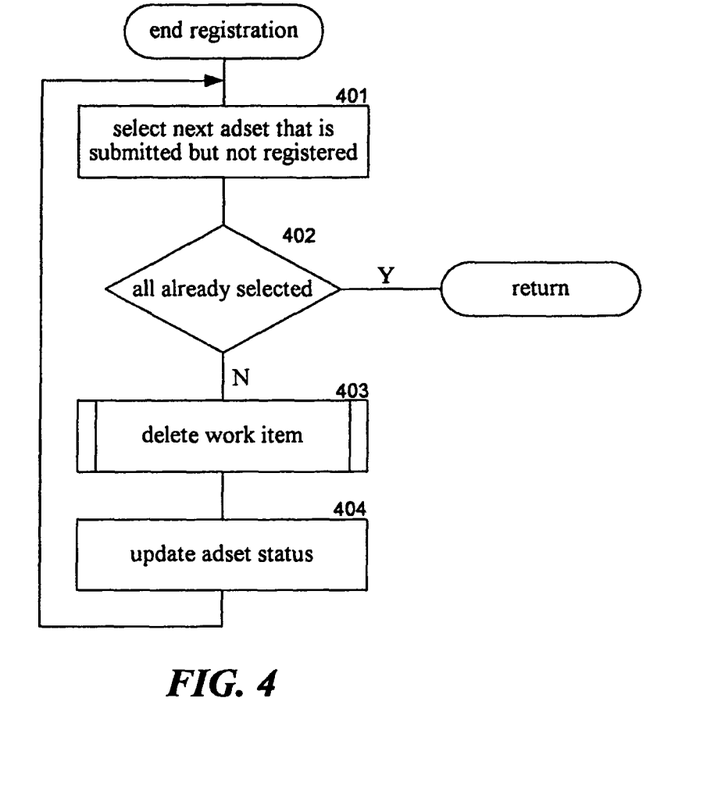
FIG. 4 is a flow diagram illustrating the processing of the end registration component in one embodiment.

FIGS. 2-4 are flow diagrams illustrating the processing of advertisement sets by the advertisement manager in one embodiment. Components of the advertisement manager are invoked by an advertisement generator to register advertisement sets. An advertisement generator invokes a begin registration component, a register advertisement set component, and then an end registration component. The begin registration component records a begin registration time stamp associated with the registration. The register advertisement set component then adds new advertisement sets and updates existing advertisement sets, setting a time stamp for each new and updated advertisement set. The end registration component withdraws advertisement sets whose time stamp is before the begin registration time stamp. The begin and end registration components allow the advertisement manager to identify and withdraw any advertisement sets that were previously registered by the advertisement generator but were not reregistered. Thus, the registration of advertisement sets by an advertisement generator effectively replaces the advertisement sets that were previously registered by that advertisement generator with a new set of advertisement sets. Therefore, the task of an advertisement generator is simplified because it only needs to register current advertisement sets and does not have to affirmatively withdraw out-dated advertisement sets.

FIG. 2 is a flow diagram illustrating the processing of the begin registration component in one embodiment. In block 201, the begin registration component stores an indication of the name of the invoking advertisement generator and the current time in the data store. The end registration component uses this information to identify the advertisement sets of the advertisement generator that were not reregistered. The component then returns.

FIG. 3 is a flow diagram illustrating the processing of the register advertisement set component in one embodiment. This component is invoked by an advertisement generator to register its current advertisement sets. The component loops, selecting each advertisement set and creating an entry in the data store if one does not already exist for that advertisement set, calculating a bid for that advertisement set, and creating a work item associated with that advertisement set as appropriate. In block 301, the component selects the next advertisement set to be registered. In decision block 302, if all the advertisement sets have already been selected, then the component returns, else the component continues at block 303. In decision block 303, if an entry for the selected advertisement set already exists in the data store, then the component continues at block 305, else the component continues at block 304. Each advertisement set may be uniquely identified by an advertisement generator and identification number combination. In block 304, the component creates an entry in the data store for the selected advertisement set. In decision block 305, if the advertisement set can be submitted, but it is not currently submitted to a search engine service, then the component continues at block 306, else the component continues at block 307. An advertisement set can be submitted if there is no conflicting advertisement set (e.g., using the same search term) currently submitted. In block 306, the component invokes the calculate bid component to generate a bid for the selected advertisement set. In decision block 307, if the selected advertisement set has a bid associated with it, then the component continues at block 308, else the component continues at block 309. In block 308, the component creates a work item for the selected advertisement set and provides it to the work manager. The work item may indicate to add a new advertisement set for submission or to update the bid of a currently submitted advertisement set. In block 309, the component updates the status of the selected advertisement set (e.g., submitted bid amount and last update time) in the data store and loops to block 301 to select the next advertisement set.

FIG. 4 is a flow diagram illustrating the processing of the end registration component in one embodiment. This component is invoked by an advertisement generator after registration of its advertisement sets. The component identifies those advertisement sets of the advertisement generator that are currently submitted but were not reregistered, and it creates a work item to withdraw that submission. The component may identify the advertisement sets that were not reregistered based on the time associated with the begin registration and the last update time of the entry for each advertisement set. In block 401, the component selects the next advertisement set for the advertisement generator that is currently submitted but was not reregistered. In decision block 402, if all such advertisement sets have already been selected, then the component returns, else the component continues at block 403. In block 403, the component creates a delete work item to withdraw the submittal and provides it to the work manager for the selected advertisement set. In block 404, the component updates the status of the selected advertisement set in the data store (e.g., not submitted) and then loops to block 401 to select the next advertisement set. Alternatively, the work manager may update the status when the advertisement submitters process the delete work items.

Figure 5:
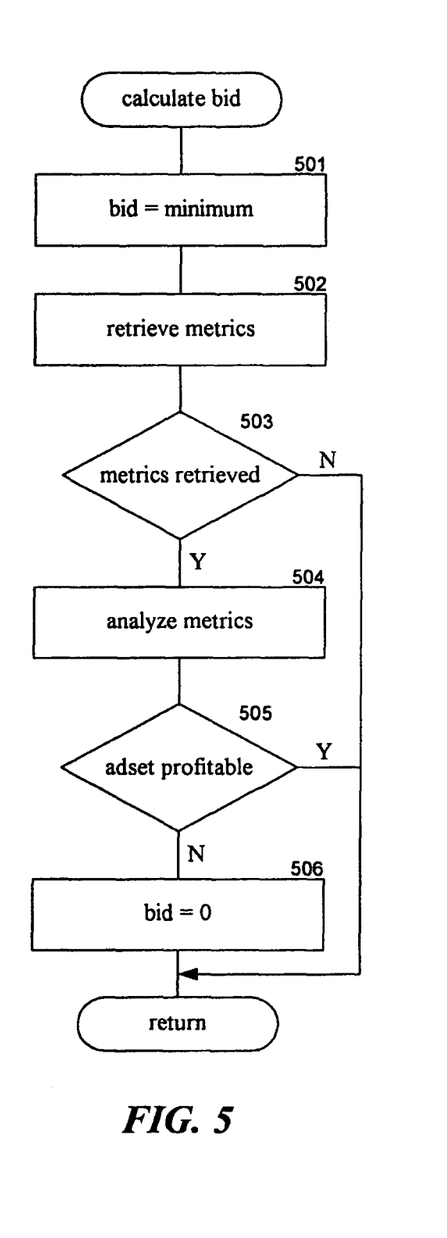
FIG. 5 is a flow diagram illustrating the processing of the calculate bid component in one embodiment.

FIG. 5 is a flow diagram illustrating the processing of the calculate bid component in one embodiment. In the illustrated embodiment, the calculate bid component sets the bid amount to the minimum bid for the search engine services unless the advertising metrics indicate that the advertisement set has not been profitable. In such a case, the component sets the bid amount to zero so the advertisement set will not be submitted to search engine services or will be withdrawn if it is submitted. The component is passed an advertisement set and returns a bid amount. In block 501, the component sets the bid amount to the minimum bid for the search engine services. Alternatively, the bid amount may be initially set based on anticipated profit per impression or click. In block 502, the component retrieves advertising metrics for the advertisement set from the data store. In decision block 503, if advertisement metrics are available for the advertisement set, then the component continues at block 504, else there is no data available to assess the profitability of the advertisement set and the component returns. In block 504, the component analyzes the retrieved advertisement metrics to assess the profitability of the advertisement set. If the metrics for the advertisement set are not available, the metrics of related advertisement sets can be used, such as those from the same advertisement generator or those for the same item. In decision block 505, if it is determined that the advertisement set is profitable, then the component returns with the minimum bid amount, else the component continues at block 506. In block 506, if the advertisement set is not profitable, then the component sets the bid amount to zero so the advertisement set either will not be submitted or will have its submission withdrawn, and then the component returns.

One skilled in the art will appreciate that various algorithms may be used to determine the bid amount, such as a minimum-bid algorithm, a fixed-bid algorithm, a profit-based algorithm, and a revenue-based algorithm. The minimum-bid algorithm sets a bid to the minimum bid amount that is specified by a search engine service assuming the placement of the advertisement is deemed worth the minimum bid. The fixed-bid algorithm sets a bid to a set amount (e.g., $0.25). The profit-based algorithm sets a bid to a bid amount calculated to produce a certain profit level (e.g., break even). For example, profit may be calculated based on the average profit resulting from the selection of an advertisement or related advertisements. Advertisements may be related in many different ways, such as being for the same product (e.g., a certain book), for the same category of product (e.g., a book), or generated by the same advertisement generator. Profit may also be calculated based on the profit of a combination of related advertisements using a metric that may factor in relatedness, size of advertising data set (e.g., the advertisement was selected 5 or 500 times), and so on. The revenue-based algorithm sets the bid to an amount based on a percentage of the anticipated revenue (e.g., 10%). Revenue can be calculated in a manner similar to the calculation of profit.

Bid amounts may be adjusted based on the anticipated conversion rate at an advertiser's web site. The conversion rate may indicate the percent of visitors who actually make a purchase at the web site. At certain times of the year (e.g., Christmas season), the conversion rate may be much higher than at other times. If an advertisement is to be placed at a time with a conversion rate that is different from the conversion rate during which the advertising metrics were collected, then the bid amount may be increased or decreased accordingly. For example, if the advertising metrics were collected when the conversion rate was 10%, and the conversion rate at time of display is expected to be 20%, then the bid amount may be doubled (e.g., multiplied by the ratio of the conversion rates) in expectation that the advertisement will more likely achieve the advertiser's objective.

Bid amounts may also be calculated or adjusted based on bids of competing advertisers. Some search engine services make their bid statistics available to all their advertisers. For example, the bid statistics may identify the search terms, bid amounts, and placement positions of advertisements. For example, if a profit-based bid amount is set, then the bid amount may be reduced when the bid statistics indicate that a lower bid amount would be sufficient to get the advertisement placed in the top three advertisement positions of a search result.

Figure 6:
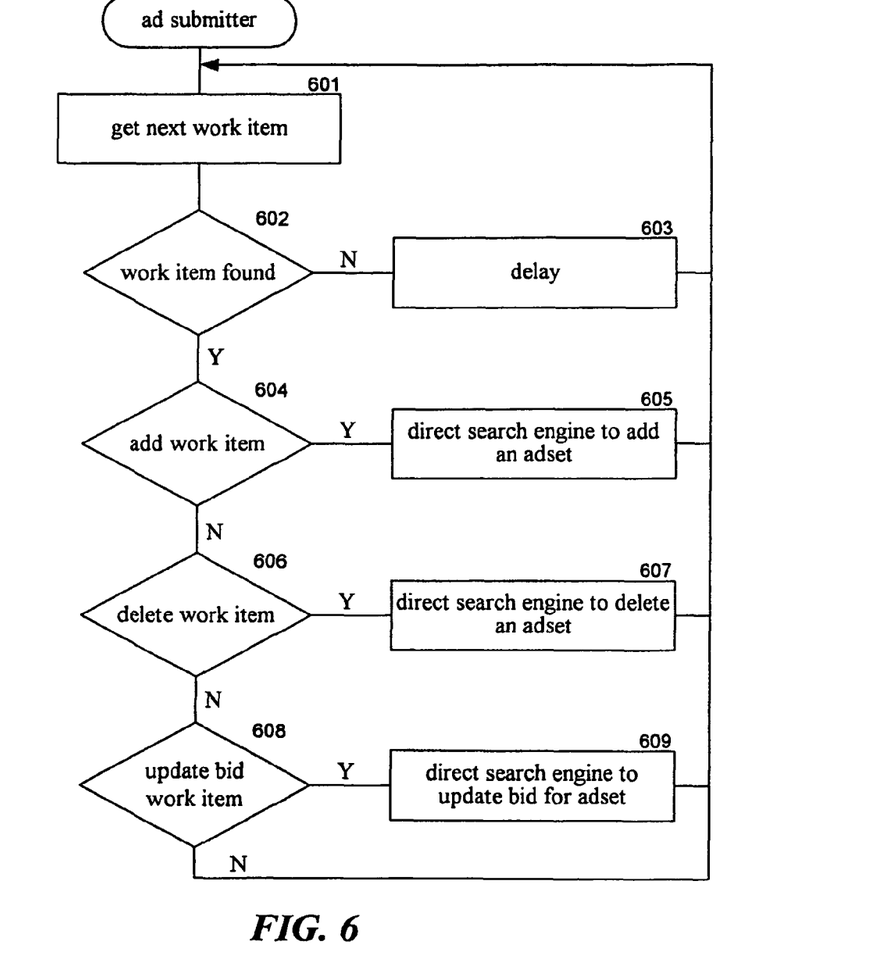
FIG. 6 is a flow diagram illustrating the processing of an advertisement submitter component in one embodiment.

FIG. 6 is a flow diagram illustrating the processing of an advertisement submitter component in one embodiment. This component loops, retrieving work items from the work manager and then sending service requests to the search engine service associated with this advertisement submitter based on the retrieved work items. If no work item is currently available, then the component goes to sleep or delays for a certain period. In block 601, the component retrieves the next work item from the work manager. In one embodiment, each work item has a priority associated with it, and the work manager may provide work items in priority order. For example, a work item to update a bid or to withdraw an advertisement set because a search term was filtered out may have a higher priority than a work item for submitting a new advertisement set. Also, a work item to decrease a bid may have a higher priority than one to increase a bid, or a work item to submit an advertisement set may have a priority set based on anticipated click rate, profit per click, and so on. In decision block 602, if a work item was retrieved, then the component continues at block 604, else the component continues at block 603. In block 603, the component delays because no work item is currently available. At the end of the delay, the component loops to block 601 to select the next work item. In decision block 604, if the work item is an add work item, then the component continues at block 605 to send a request to the search engine service to submit the advertisement set, else the component continues at block 606. In decision block 606, if the work item is a delete work item, then the component continues at block 607 to send a request to the search engine service to withdraw the previously submitted advertisement set, else the component continues at block 608. In decision block 608, if the work item is an update bid work item, then the component continues at block 609 to send a request to the search engine service to update the bid amount for the advertisement set. The component then loops to block 601 to retrieve the next work item from the work manager.

Figure 7:
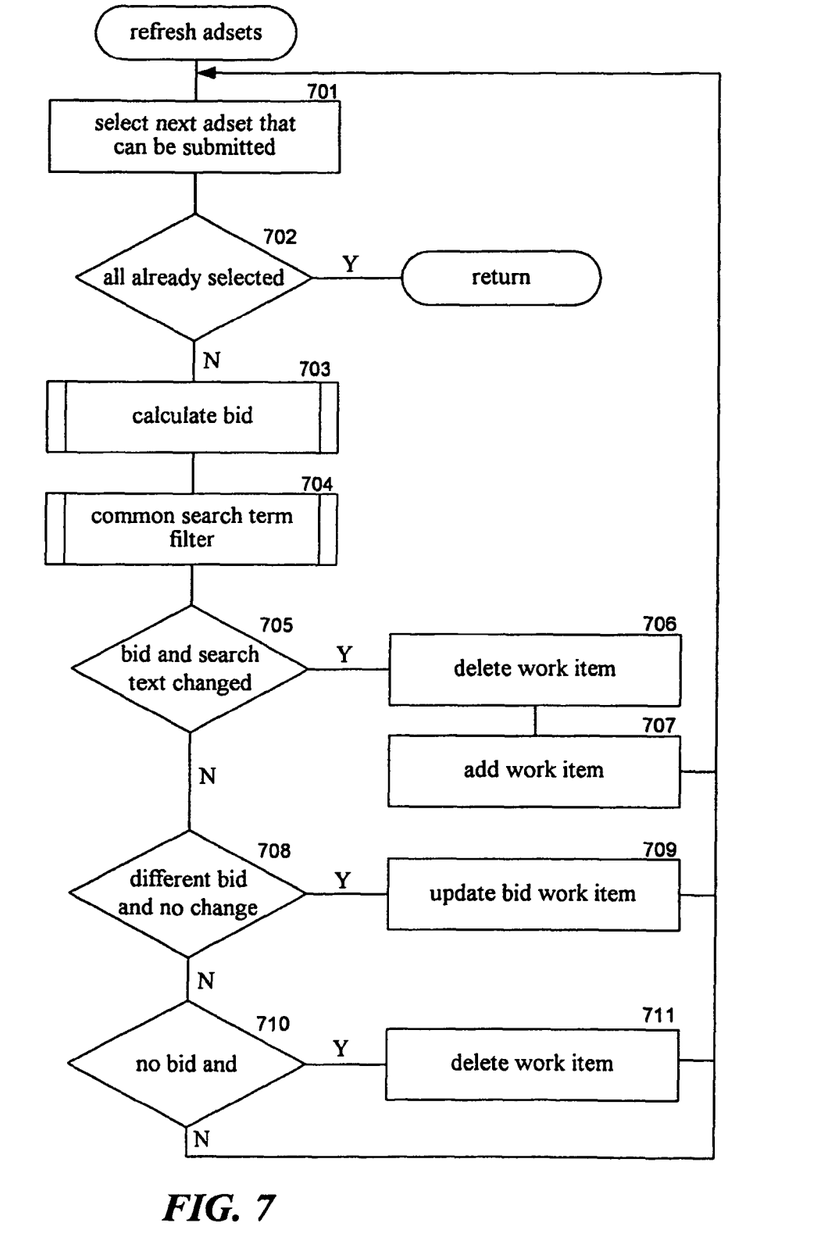
FIG. 7 is a flow diagram illustrating the processing of a refresh advertisement set component of the advertisement manager in one embodiment.

FIG. 7 is a flow diagram illustrating the processing of a refresh advertisement set component of the advertisement manager in one embodiment. The refresh advertisement set component is invoked periodically to determine whether bid amounts should be recalculated or whether an advertisement set specifies a search term that is now considered common or otherwise undesirable. The component loops, selecting advertisement sets that can be submitted. An advertisement set can be submitted if it is not currently submitted and there is no conflicting advertisement set that is currently submitted. In block 701, the component selects the next advertisement set that can be submitted. In decision block 702, if all such advertisement sets have already been selected, then the component returns, else the component continues at block 703. In block 703, the component invokes the calculate bid component to generate a bid for the selected advertisement set. In block 704, the component invokes the common search term filter component to determine whether the selected advertisement set includes a search term that is too common. In decision block 705, if the selected advertisement set has a nonzero bid and a search term has been removed, then the component continues at block 706, else the component continues at block 708. In blocks 706 and 707, the component withdraws a submitted advertisement set whose search terms have been filtered and, as appropriate, submits the advertisement set with the remaining search terms. In block 706, the component submits a delete work item for the selected advertisement set. In block 707, the component provides to the work manager an add work item for the selected advertisement set without the filtered out search terms. The component then loops to block 701 to select the next advertisement set. In decision block 708, if the bid amount is different from the previous bid amount and no search term was filtered out, then the component continues at block 709, else the component continues at block 710. In block 709, the component provides an update bid work item to the work manager for the selected advertisement set and then loops to block 701 to select the next advertisement set. In decision block 710, if the selected advertisement set has no bid associated with it, then the component continues at block 711, else the component loops to block 701 to select the next advertisement set. In block 711, the component provides to the work manager a delete work item request for the selected advertisement set and then loops to block 701 to select the next advertisement.

Figure 8:
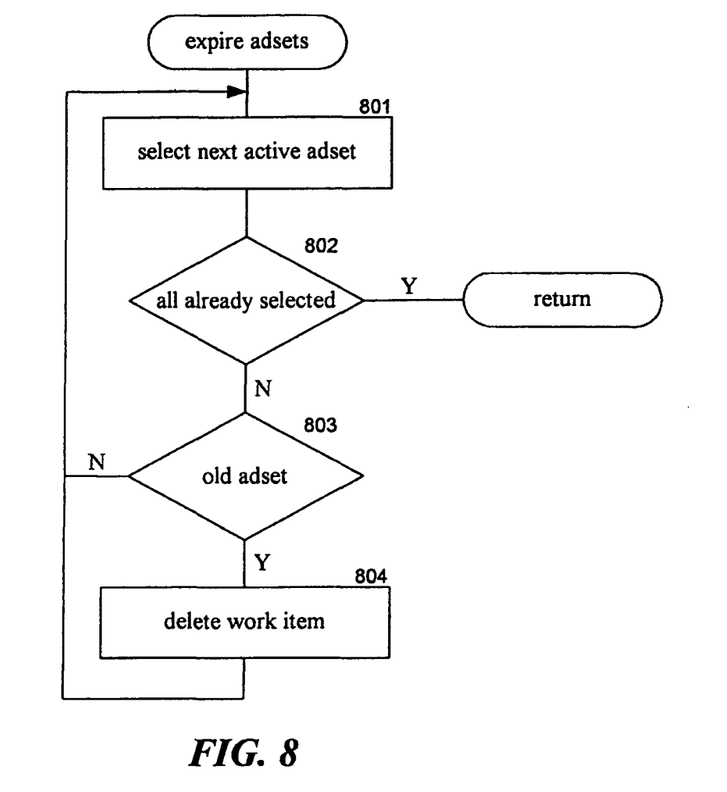
FIG. 8 is a flow diagram illustrating the processing of the expire advertisement set component of the advertisement manager in one embodiment.

FIG. 8 is a flow diagram illustrating the processing of the expire advertisement set component of the advertisement manager in one embodiment. This component is invoked periodically to determine which submitted advertisement sets are old and withdraws their submission. In block 801, the component selects the next submitted advertisement set. In decision block 802, if all the submitted advertisement sets have already been retrieved, then the component returns, else the component continues at block 803. In decision block 803, if the selected advertisement set is too old (e.g., it has been some time since its entry was last updated), then the component continues at block 804, else the component loops to block 801 to select the next submitted advertisement set. In block 804, the component provides to the work manager a delete work item for the selected advertisement set and loops to block 801 to select the next submitted advertisement set.

Figure 9:
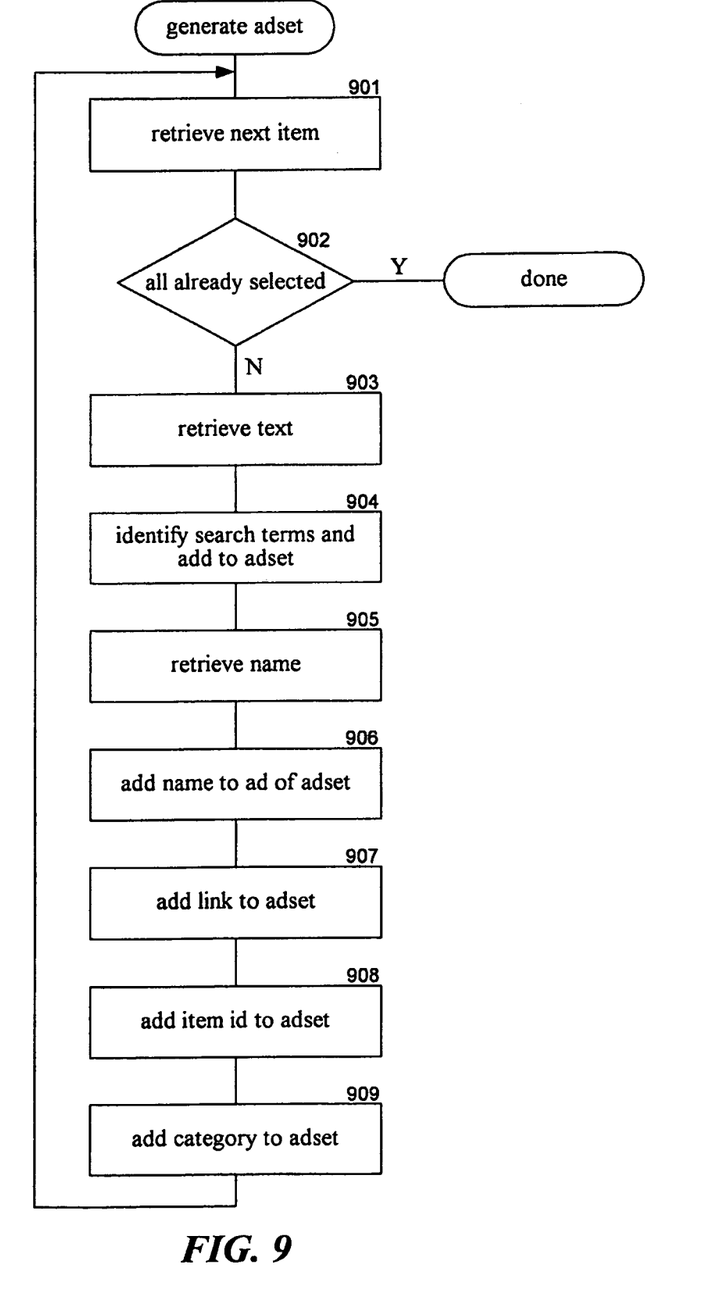
FIG. 9 is a flow diagram illustrating the processing of an advertisement generator in one embodiment.

FIG. 9 is a flow diagram illustrating the processing of an advertisement generator in one embodiment. In this embodiment, the advertisement generator scans a catalog of items, identifies search terms from a description of those items, generates advertisements based on the item descriptions, and identifies a link to a detailed web page associated with the item. In block 901, the component retrieves the record for the next item from the catalog. In decision block 902, if the records for all the items have already been retrieved, then the component completes, else the component continues at block 903. In block 903, the component retrieves the description from the record. In block 904, the component identifies the search terms from the description and adds the search terms to the advertisement set. If the item is a book, then the search terms may be derived from the title of the book. In block 905, the component retrieves a name from the record. If the item is a book, then the name may be the title of the book. In block 906, the component adds the name to the advertisement of the advertisement set. In block 907, the component adds a link from the record to the advertisement set. In block 908, the component adds the item identifier from the record (e.g., SKU) to the advertisement set. In block 909, the component adds a category for the item to the advertisement set. For example, the category may be book, DVD, and so on. The category may be used by the advertisement manager to decide which advertisement sets should be submitted or for calculating bid amounts. The component then loops to block 901 to select the record for the next item.

Figure 10:
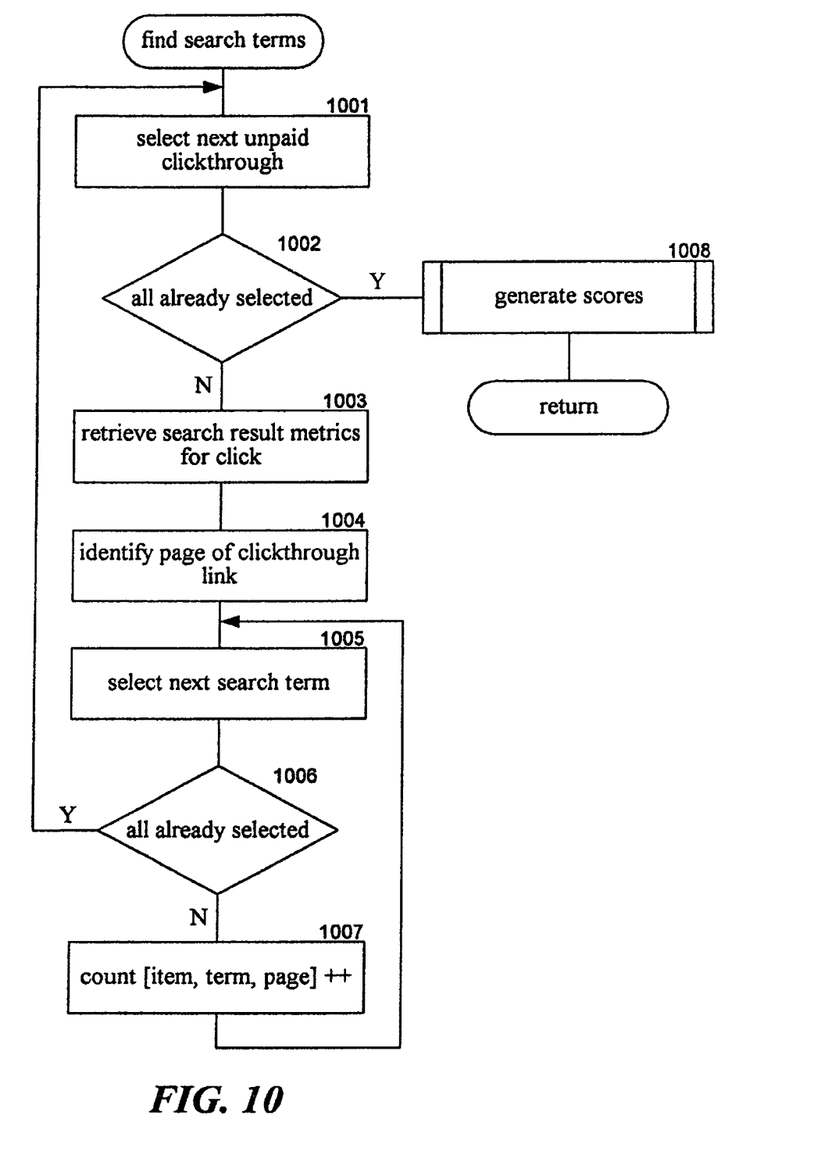
FIG. 10 is a flow diagram illustrating the processing of a find search term component of an advertisement generator in one embodiment.

FIG. 10 is a flow diagram illustrating the processing of a find search term component of an advertisement generator in one embodiment. The find search term component is passed a reference to an item and determines whether users selected links to that item when the links were not prominently displayed in search results. If so, the component generates scores for the search terms so the advertisement generator can select the search terms with the highest scores for use in its advertisement sets. In block 1001, the component selects the next selection (e.g., click) information for the item. In decision block 1002, if all the selection information has already been selected, then the component continues at block 1008, else the component continues at block 1003. In block 1003, the component retrieves the advertising metrics associated with the selection of links to an item. In block 1004, the component identifies the page of a search result on which a link was included. In blocks 1005-1007, the component loops, collecting statistics for each search term associated with the search results of the selection information. In block 1005, the component selects the next search term of the search request. In decision block 1006, if all the search terms have already been selected, then the component loops to block 1001 to select the next selection information, else the component continues at block 1007. In block 1007, the component updates a count for the combination of item, selected search term, and page associated with the search result and then loops to block 1005 to select the next search term. In block 1008, the component invokes the generate scores component to generate scores for each item and search term combination and then returns.

Figure 11:
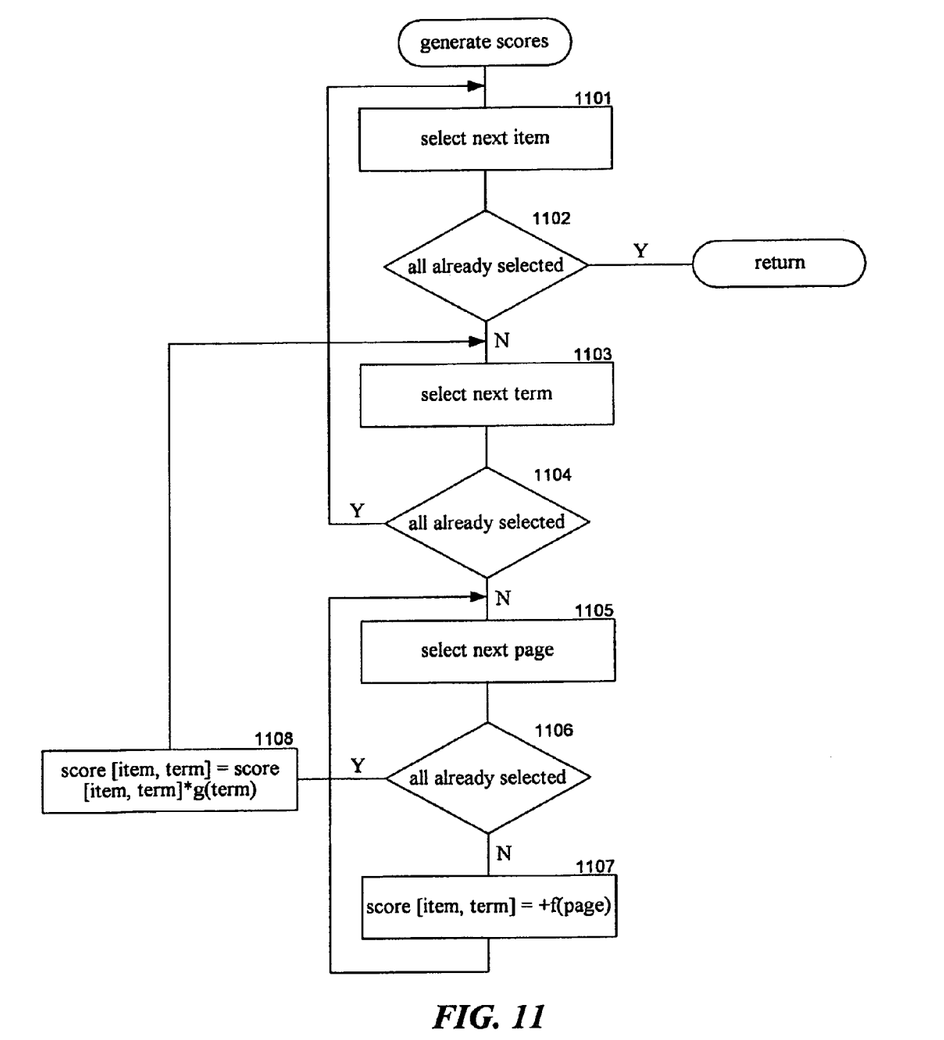
FIG. 11 is a flow diagram illustrating the processing of the generate scores component in one embodiment.

FIG. 11 is a flow diagram illustrating the processing of the generate scores component in one embodiment. This component generates a score for item and search term combinations that indicates whether users selected links to a given item from search results that included a given search term. In block 1101, the component selects the next item. In decision block 1102, if all the items have already been selected, then the component returns, else the component continues at block 1103. In block 1103, the component selects the next search term associated with the selected item. In decision block 1104, if all the search terms have already been selected, then the component loops to block 1101 to select the next item, else the component continues at block 1105. In blocks 1105-1107, the component loops, factoring in the count of the number of times a link was selected when included on a certain page of the search results. In block 1105, the component selects the next page. In decision block 1106, if all the pages have already been selected, then the component continues at block 1108, else the component continues at block 1107. In block 1107, the component generates a score for the selected item and selected term that is a function of the count of the selected page. For example, the function may generate a higher score for higher page numbers. The component then loops to block 1105 to select the next page. In block 1108, the component updates the score for the selected item and selected search term to factor in the frequency associated with the selected search term. The frequency may indicate the total number of times a link to the selected item was included in search results. The component then loops to block 1103 to select the next search term for the selected item.

One skilled in the art will appreciate that although specific embodiments of the advertisement system have been described herein for purposes of illustration, various modifications may be made without deviating from the spirit and scope of the invention. The term "item" includes any product, service, or concept that can be advertised. For example, a political party can place advertisements relating to a particular candidate or cause. In addition, an advertisement set may not have a link associated with it. An advertiser may want to simply display the information of an advertisement to users who submit requests using a certain search term. For example, a candidate may want an advertisement displayed when a user submits a search request with the name of their opponent as a search term. In one embodiment, the advertisement sets may be generated automatically by a computer algorithm, manually by advertisers, or by some combination thereof. In one embodiment, when multiple advertisement sets conflict, the advertisement manager may submit the advertisement sets in a round-robin manner so the effectiveness of each advertisement set can be assessed and the most effective advertisement set can ultimately be submitted. Also, the bid amount may be modified based on the advertisement generator. For example, a certain advertisement generator may generate advertisement sets that have been historically much more effective than the advertisement set of other advertisement generators. In one embodiment, the common search terms can be identified by analyzing information such as product reviews that have been provided by users. If a word or phrase is used in more than a certain percent of the reviews, then it is considered too common. More generally, the analysis can be performed on a corpus that includes all or a portion of the web pages that are accessible. Accordingly, the invention is not limited except by the appended claims.

We claim:

1. A system for requesting advertisements to be placed along with content on behalf of an advertiser in association with at least one keyword, comprising:
   one or more computer systems that collectively implement at least:
   a plurality of advertisement generators that each use at least one algorithm to identify search terms corresponding to an item, determine at least one item-specific visual element, create a link to information about the item, and generate an advertisement set for the item that includes at least one associated advertisement having the item-specific visual element, the link, and at least one search term matching the at least one keyword;
   a fee calculator that at least calculates fee amounts for each of the advertisement sets generated by the advertisement generators based at least in part on anticipated profitability of the advertisement sets;
   an advertisement manager that, at least:
      receives from the advertisement generators advertisement sets,
      receives from the fee calculator a fee amount for each of the generated advertisement sets,
      determines whether an advertisement set is currently submitted to an advertisement placement service for a set of keywords including the at least one keyword,
      when an advertisement set is not currently submitted to the advertisement placement service for the set of keywords, selects one of the generated advertisement sets for submission to the advertisement placement service; and
      when an advertisement set is currently submitted to the advertisement placement service for the set of keywords, determines whether at least one of the generated advertisement sets would avoid conflict with the submitted advertisement set with respect to the at least one search term of the submitted advertisement set and, when at least one of the generated advertisement sets is determined to avoid conflict, selects one of the generated advertisement sets determined to avoid conflict; and
   an advertisement submitter that, when an advertisement set is not currently submitted to the advertisement placement service for the set of keywords at least:
      receives from the advertisement manager the selected advertisement set and the fee amount for the selected advertisement set, and
      sends to the advertisement placement service a request to place the selected advertisement set along with content associated with the keyword at the fee amount of the selected advertisement set.

2. The computer system of claim 1 wherein the fee amount is a bid for an auction.

3. The computer system of claim 1 wherein the advertisement manager selects one of the generated advertisement sets based at least in part on a determined likelihood of users selecting the advertisement of the advertisement set when the advertisement is placed along with the content associated with the keyword.

4. The computer system of claim 1 including multiple advertisement submitters where each advertisement submitter is associated with a respective different advertisement placement service.

5. The computer system of claim 1 including a database containing statistics relating to placements of advertisements and wherein the fee calculator determines anticipated profitability based at least in part on analysis of the statistics.

6. The computer system of claim 5 wherein the statistics include average cost-per-click of an advertisement and average revenue-per-click.

7. A method in a computer system for placing advertisements for an advertiser offering an item for consumption, the method comprising:
   under the control of one or more computer systems configured with executable instructions,
      using each of a plurality of different algorithms to at least:
         identify search terms corresponding to the item;
         determine at least one item-specific visual element;
         create a link to information about the item; and
         generate an advertisement set for the item that each include at least one associated advertisement having the item-specific visual element, the link, and one or more of the identified search terms;
      submitting one or more of the generated advertisement sets to an advertisement placement service with a bid amount;
      determining whether at least one of the generated advertisement sets would avoid conflict with the submitted one or more advertisement sets with respect to the at least one search term of the submitted one or more advertisement sets;
      when at least one of the generated advertisement sets is determined to avoid conflict:
         selecting, based at least in part on the identified search terms of the submitted one or more advertisement sets, an unsubmitted advertisement set that avoids conflict with the submitted one or more advertisement sets; and
         submitting the selected unsubmitted advertisement set to the advertisement placement service.

8. The method of claim 7 further comprising:
   analyzing, based at least in part on profit resulting from user selection of submitted one or more advertisement sets, the effectiveness of the one or more submitted advertisement sets, and wherein said selecting is based at least in part on said analyzing.

9. The method of claim 7 wherein the advertisement placement service places the advertisements associated with the submitted one or more advertisement sets with search results associated with a search term matching the at least one common keyword.

10. The method of claim 7 wherein the advertisement placement service places the advertisements associated with the submitted one or more advertisement sets with content associated with a keyword that matches the one or more identified search terms of the submitted one or more advertisement sets.

11. The method of claim 7 including calculating the bid amount based at least in part on advertising metrics collected by the advertiser.

12. The method of claim 11 including adjusting the bid amount based at least in part on the advertising metrics.

13. The method of claim 7 wherein selecting the unsubmitted advertisement set is based at least in part on the effectiveness of an advertisement generator that generated the advertisement sets.

14. The method of claim 7 including calculating the bid amount based at least in part on a profit-based algorithm.

15. The method of claim 7 including calculating the bid amount based at least in part on a revenue-based algorithm.

16. The method of claim 7 wherein the advertisement placement service is a search engine service.

17. The method of claim 7 including filtering the generated advertisement sets based at least in part on frequency of keywords in content.

18. The method of claim 7 including filtering the generated advertisement sets based at least in part on desirability of keywords.

19. A computer program product embedded in a computer-readable medium and including processor-executable instructions for placing advertisements, comprising:
program code for using a plurality of different algorithms to:
identify search terms corresponding to the item;
determine at least one item-specific visual element;
create a link to information about the item;
generate an advertisement set for the item that each include at least one associated advertisement having the item-specific visual element, the link, and at least one search term of the identified search terms;
program code for associating each generated advertisement set with a corresponding bid amount;
program code for determining whether an advertisement set is currently submitted for the search terms included in the generated advertisement sets;
program code for, when an advertisement set is not currently submitted for the search terms included in the generated advertisement sets, submitting a request specifying a selected advertisement set for the set of keywords;
program code for, when one or more advertisement sets are currently submitted for at least one search term included with at least one corresponding generated advertisement set:
determining whether one or more unsubmitted generated advertisement sets would avoid conflict with the one or more currently submitted advertisement sets with respect to the at least one search term of the one or more currently submitted advertisement sets; and
when one or more of the generated advertisement sets is determined to avoid conflict:
selecting one of the unsubmitted generated advertisement sets determined to avoid conflict and
submitting the selected one or more unsubmitted generated advertisement sets determined to avoid conflict.

20. The method of claim 7, further comprising:
detecting a potential conflict among at least two of the generated advertisement sets with respect to the identified search terms for the at least two generated advertisement sets; and
submitting the at least two generated advertisement sets for which the potential conflict was detected in a round-robin manner.

* * * * *